United States Patent [19]
Bartlett et al.

[11] 3,832,542
[45] Aug. 27, 1974

[54] WIDE RANGE RADIATION GAGE HAVING A CONTROLLED-GAIN PHOTODETECTOR FOR DETERMINING A MATERIAL PROPERTY

[75] Inventors: William G. Bartlett, Stockertown; Edmund L. Mangan, Bethlehem, both of Pa.

[73] Assignee: Bethlehem Steel Corporation, Bethlehem, Pa.

[22] Filed: June 22, 1972

[21] Appl. No.: 265,415

[52] U.S. Cl. .................... 250/71.5 R, 250/83.3 D
[51] Int. Cl. ............................................. G01t 1/20
[58] Field of Search ......... 250/83.3 D, 71.5 R, 83 C

[56] References Cited
UNITED STATES PATENTS
3,524,063  8/1970  Mangan ...................... 250/83.3 D

*Primary Examiner*—James W. Lawrence
*Assistant Examiner*—Davis L. Willis
*Attorney, Agent, or Firm*—Joseph J. O'Keefe

[57] ABSTRACT

A high energy nuclear radiation source and a scintillation detector are combined to gate a material property, such as steel plate thickness, when the material is placed in a beam of radiation. The detector includes a photomultiplier tube which operates in a servo loop with a voltage controlled variable dynode voltage source, the latter controlling tube gain to maintain anode current substantially constant over a wide range of gaging. Gage operation is based on the phenomena of a non-linear photomultiplier tube gain characteristic being inverse and nearly equal to the nonlinear radiation absorption characteristic of the material being gaged. This yields a dynode voltage which varies only slightly nonlinearly as a measure of the material property. The gage includes a linearizer for correcting the nonlinearity of a fraction of the dynode voltage and this signal is ultimately applied to a material property indicator. Also included is an automatic zero adjuster for continuously providing a zero-based gaging signal under variable operating conditions, and a material presence/absence detector for casuing the zero adjuster to act only during the absence of material from the gage. In addition, a signal conditioner modifies the linearized signal to compensate for variations in other material properties which affect the gaging property.

30 Claims, 6 Drawing Figures

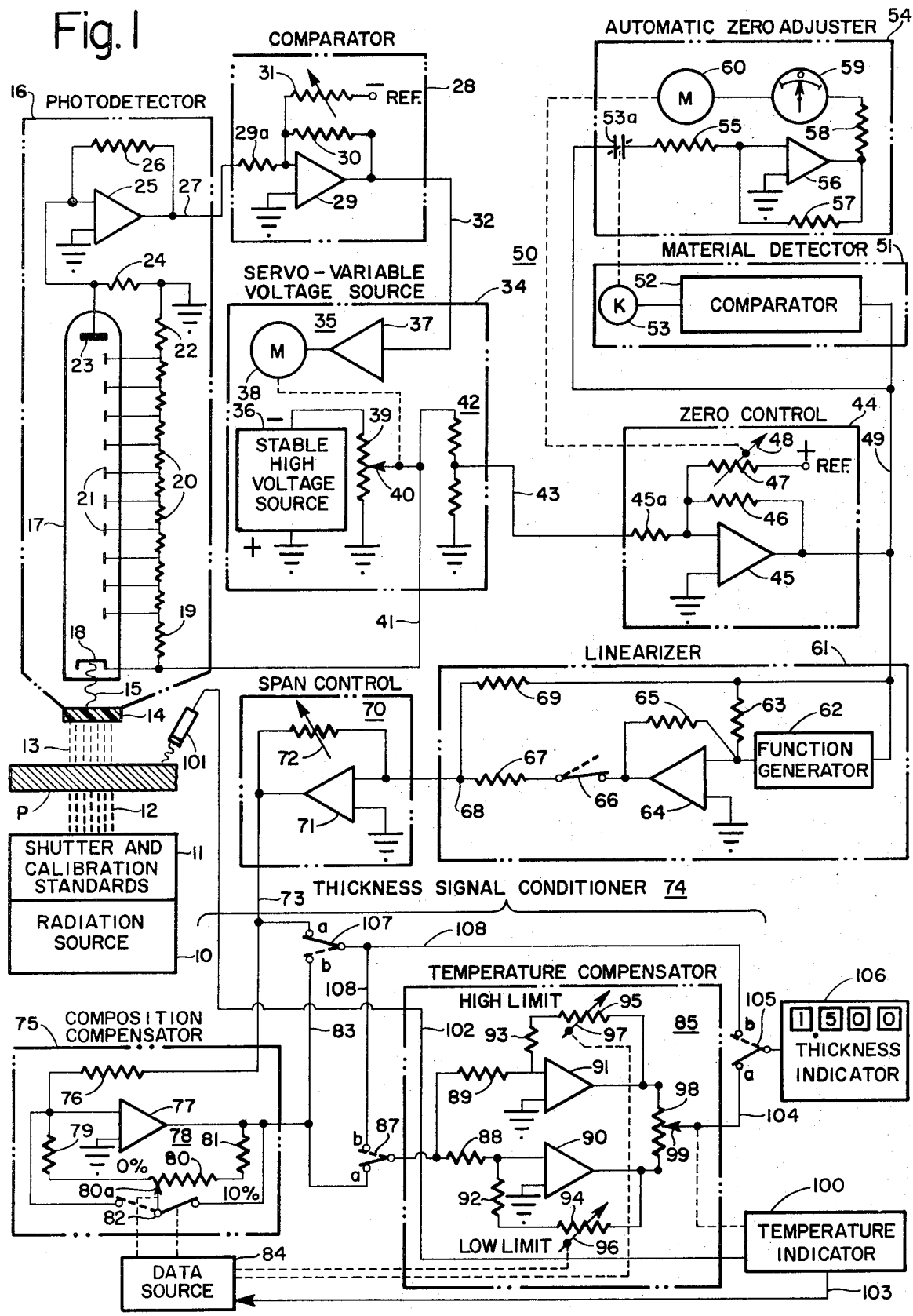

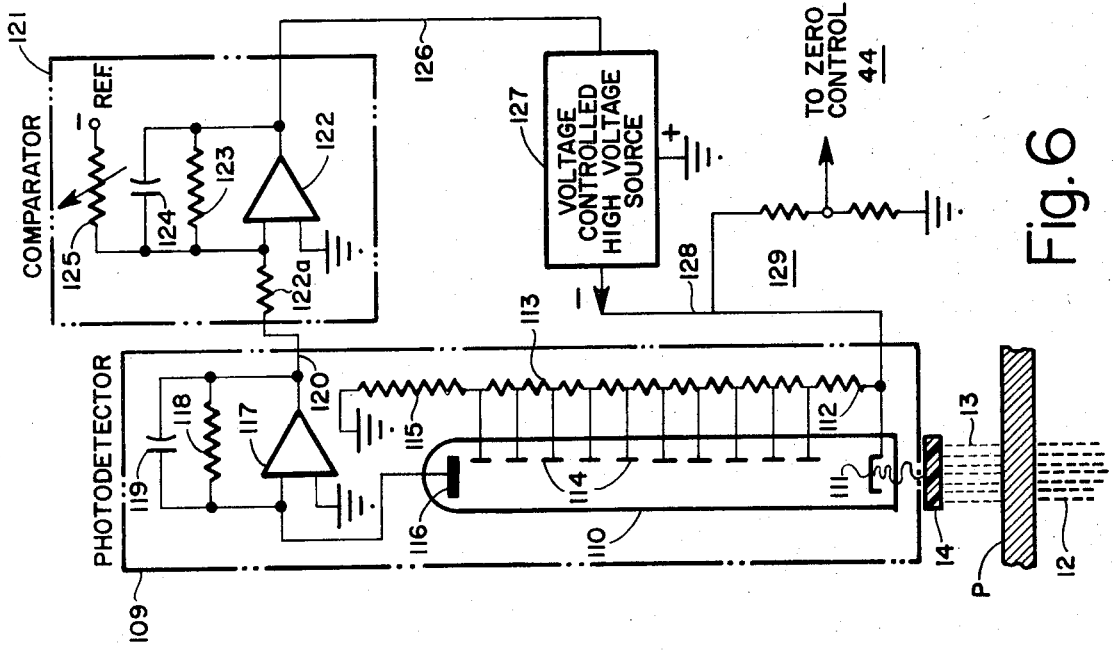
Fig.6
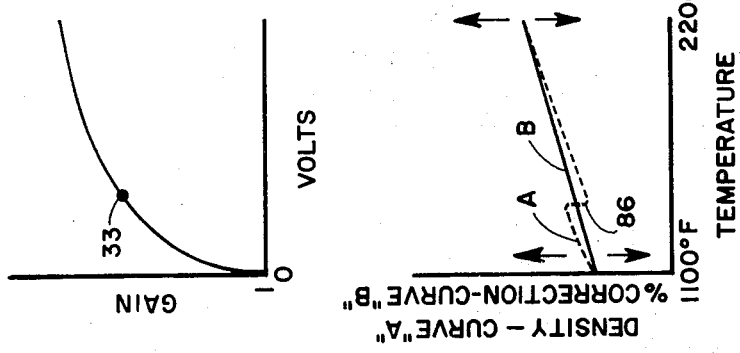
Fig.3
Fig.5
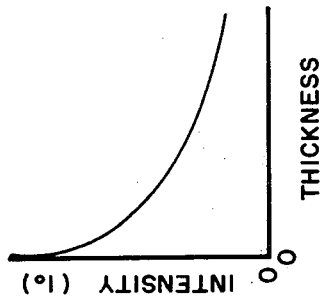
Fig.2
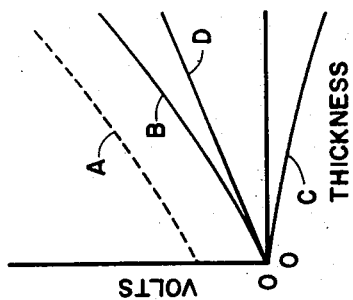
Fig.4

WIDE RANGE RADIATION GAGE HAVING A CONTROLLED-GAIN PHOTODETECTOR FOR DETERMINING A MATERIAL PROPERTY

BACKGROUND OF THE INVENTION

I. Field of the Invention

This invention relates broadly to improved gaging apparatus for determining a material property. More particularly it relates to a wide-range radiation gage having a controlled-gain photodetector for determining a material property. Herein after, the invention is described with reference to accurately measuring a wide range of steel plate thickness, or steel strip thicknesses, in a hot steel rolling mill which normally produces a steel product under variable operating conditions. However, it will become apparent that the invention is equally applicable to gaging other materials, and other properties such as weight per unit area or density, and to other industrial installations as well as to a variety of laboratory apparatus.

2. Description of the Prior Art

Contemporary hot steel rolling mills utilize both manual- and computer-controlled gaging systems to facilitate high-speed production of hot steel plate and strip. Gaging systems require rapidly responsive, highly accurate, and quite reliable electrical signals representing linear indications of plate or strip thickness during a wide range of operating conditions covering both variable production rates as well as material properties. For example, it is desired that thickness gages have a protracted accuracy of ± ½ percent in a hot steel rolling mill environment, yet read or provide electrical signals in terms of material thickness corresponding to what the material will be when later cooled to room temperature. In addition, gaging of a hot steel plate or strip must be done when material thickness varies in a range of up to 3 inches and more, material temperature is in a range of between 1100°F. and 2200°F. and varies during rolling, and material density, or composition or grade as it is frequently referred to, may be in a range of ± 10 percent of calibration standards, but is considered constant for a given run through a rolling mill.

Heretofore, commericially available radiation thickness gages having the range and measuring speed necessary for steel mill applications were limited to two types of gages which were usable only in strip mills. Both types of gages have an x-ray source of penetrative radiation but one gage has a fixed exciting potential and the other gage a variable exciting potential. However, both gages operate in response to the mass absorption phenomenon. That is, when test material is caused to enter a beam of penetration radiation and its thickness varies linearly, the amount of radiation absorbed by the material per unit area thereof is registered exponentially or nonlinearly by a radiation-sensitive detector calibrated in terms of material thickness. It is to be noted that radiation absorption, and therefore apparent material thickness, also varies (1) randomly because of the statistical manner in which x-radiation emanates from its source, (2) as a complex function of radiation wavelength and intensity, (3) as a complex function of material composition or grade, and (4) as a predetermined function of material temperature, which function is considered linear for a given material composition having a temperature in a given range and subject to a constant predetermined rate of temperature change. Under other conditions function (4) is considered nonlinear.

An example of commercially available x-ray thickness gage having a fixed exciting potential is a multi-range gage described by E. L. Mangan in U.S. Pat. No. 3,524,063. This gage is a deviation type of thickness gage designed to incorporate a powerful steady x-ray source and to overcome the problem of nonlinearities caused by the mass absorption phenomenon. The latter is achieved by operating at one of five preselected points on an exponential curve representing the output of a scintillator-photomultiplier tube type of detector, and therefore in one of five preselected material thickness ranges. Each range is caused to be standardized initially at a corresponding operating point with the aid of built-in metallic thickness standards. Later, during normal operation, an operator turns dials for a desired thickness setting and automatically causes complementary metallic digital thickness standards to be inserted into the beam of radiation, whereby the gage normally measures the thickness of material being gaged and that of the metallic standards. When the material to be gaged has the desired thickness, an indicator is caused to read zero at a corresponding operating point. Any other value is interpreted as a deviation of material being gaged from the desired thickness preselected by the operator. In addition, this gage has material temperature and composition compensation which is provided by generating, summing and scaling separate signals representing these parameters, then algebraically summing the resulting signal with a thickness deviation signal fed to the indicator.

The other type of commercially available gage is an x-ray thickness deviation gage which has a variable excitation potential and utilizes a dual beam and double detector measuring technique exemplified by General Electric Company's "Ray-Mike" series of gages. In this gage, a powerful x-ray tube is so positioned that a portion of its beam is caused to pass through the material to be measured, and another portion of the beam is caused to pass through an accurately ground metallic calibrating wedge. The beams are detected by two separate and balanced radiation-sensitive elements such as ionization detectors. Non-linearities due to the mass absorption phenomenon are handled by way of a coordinated system for accurately locating the wedge and simultaneously changing the x-ray tube exciting potential. An operator causes this action to take place when he dials a desired thickness setting into the gage. Detector outputs are then compared electronically and any difference between them is displayed as material thickness deviation from the desired value.

Both types of commercially available x-ray thickness gages have proved satisfactory in some respects when measuring hot steel strip of up to about 0.500 inch thick. However, neither type gage has been able to fully meet, or reliably maintain, the present gaging requirements for a hot plate rolling mill. For example, there is considerable difficulty in generating x-radiation of suitable wavelength and intensity to penetrate carbon steel plates up to about 3 inches thick. There is also considerable difficulty in controlling such x-radiation source during gaging, whether it be to precisely vary the exciting potential or to maintain it absolutely constant. Neither type gage provides single-range gaging over a wide range of measurements of a material property such as thickness of steel plates. Both types of gages are costly and have complex electronic and/or electromechanical measuring circuits and equipment requiring frequent calibration checks and/or maintenance down-time. In addition, gaging inaccuracies develop because foreign matter, such as particles of dirt and mill scale, normally occurring during rolling mill operations, becomes lodged on source and detector windows located in the beam of radiation. More importantly, each of the commercial thickness deviation gages requires an operator to preset the desired material thickness into the gage prior to gaging so that the indicator will read in terms of thickness deviation from the desired value. This has the disadvantage of not providing a direct reading thickness gage independent of desired thickness presetting which, for example, a rolling mill operator must have in order to set and adjust roll gaps during manual mode of mill operation.

SUMMARY OF THE INVENTION

One of the objects of this invention is to provide improved gaging apparatus which overcomes the foregoing difficulties in determining a material property.

Another of the objects of this invention is to provide single-range gaging apparatus for accurately determining a wider range of measurements of a material property such as steel plate thickness than heretofore available.

Another object of this invention is to provide radiation gaging apparatus adapted to use a constant source of nuclear radiation instead of x-radiation for determining a material property such as steel plate thickness.

Another object of this invention is to provide direct-reading radiation gaging apparatus devoid of desired-value presetting requirements for determining a wide range of measurements of a material property such as steel plate thickness.

A further object of this invention is to provide single-range radiation gaging apparatus having a linear signal indicative of a wide range of measurements of a material property such as steel plate thickness.

Another object of this invention is to provide direct-reading radiation gaging apparatus adapted to automatically correct gage zero when foreign matter becomes lodged in the radiation pathway.

Still another object of this invention is to provide direct-reading radiation gaging apparatus adapted to measure a material first property and modify a measurement signal to correct for variations in one or more additional properties of said material which affect said measurement.

A further object of this invention is to provide direct-reading apparatus for gaging steel plate thickness by nuclear radiation and issuing a linear thickness signal modified to compensate for variations in plate temperature and composition.

Another object of this invention is to provide radiation gaging apparatus for accurately measuring a wide range of steel plate thicknesses which is simpler and less costly to construct, operate and maintain than heretofore available.

The foregoing objects can be obtained by radiation gaging apparatus which employs a stable high-energy source of nuclear radiation, instead of x-radiation, and a wide-range controlled-gain photodetector coupled to a scintillator that converts the beam of radiation emerging from the steel plate into light which varies proportional to the nonlinear mass absorption phenomenon. The photodetector includes a photomultiplier tube having an exponential or nonlinear tube gain versus dynode voltage phenomenon which has been discovered to be inverse and nearly equal in effect to the nonlinear mass absorption phenomenon. Advantage is taken of this phenomena by operating the photomultiplier tube in a feedback loop responsive to the scintillator light and wherein anode current flow causes the development of an error signal. The error signal regulates a controlled high voltage supply connected to the photomultiplier tube's dynodes, thereby varying dynode voltage and tube gain to maintain anode current substantially constant. As a result, the dynode voltage varies slightly nonlinearly as a wide-range measure of steel plate thickness. The gaging apparatus also includes means for automatically zeroing a fractional portion of the dynode voltage when no plate is in the gage; means for linearizing the zeroed voltage; means for scaling the linearized voltage into volts per units of thickness; signal conditioning means for modifying the thickness signal for variations therein due to variations in plate composition and temperature; and a single, wide-range, digital thickness indicator driven by the linearized and conditioned thickness signal.

BRIEF DESCRIPTION OF THE DRAWINGS

FIG. 1 is a schematic diagram of a wide-range radiation gage embodiment of the present invention.

FIG. 2 is a graph illustrating the mass absorption phenomenon in terms of radiation emerging from material being gaged versus a material property such as thickness at a known density.

FIG. 3 is a graph illustrating the radiation detector's photomultiplier tube gain versus dynode voltage phenomenon.

FIG. 4 is a graph illustrating (A) the photomultiplier dynode fractional voltage, (B) zeroed dynode voltage, (C) linearizer generated voltage, and (D) linearized and scaled voltage, all versus a material property such as thickness.

FIG. 5 is a graph illustrating (A) the effects of steel plate density versus temperature, and (B) the percent correction applied to the thickness signal by a temperature compensator of the present invention.

FIG. 6 is a schematic diagram of a photodetector operating in a feedback loop having an alternate source of dynode voltage as compared to the embodiment of FIG. 1.

DESCRIPTION OF THE PREFERRED EMBODIMENTS

Referring to FIG. 1, a preferred embodiment of the invention will be described in relation to a wide-range radiation gage for accurately measuring the thickness of a hot-rolled, low-carbon steel plate of known composition or grade, in 0.001 inch increments in a single range from 0.0 to 3.000 inches thickness. Measurements are made in a hot steel plate rolling mill environment as noted above. The invention is not limited to this embodiment as other materials and material properties, such as density and weight per unit area, may be substituted for hot steel plate thickness.

In the preferred embodiment shown in FIG. 1, the thickness gage utilizes a constant source of nuclear radiation 10, preferably monoenergetic, as a source of penetrative gamma photons. Three curies of Caesium 137, which emits energy at approximately 667 keV and has a half life of about 30 years, will insure adequate photon penetration of steel having a thickness of at least three inches.

Coupled to radiation source 10 is shutter and calibration standards assembly 11 which is of conventional design. Calibration standards consist of a plurality of individual discs of known composition each precisely ground to a predetermined thickness as required to cover the gage thickness range. Operation of the shutter and calibration standards may be by either manual or automatic controls, now shown.

When the shutter is open, a beam of penetrative radiation 12 from constant source 10 is passed through steel plate P. In so doing, radiation beam 12 is subject to attenuation according to the nonlinear absorption phenomenon illustrated graphically in FIG. 2. Subsequently it becomes known as a beam of emergent radiation 13. Radiation beam 12 will become attenuated as follows:

$$I = I_o e^{-(\mu/\rho)\rho t} \text{ where} \tag{1}$$

$I$ = Intensity of emergent radiation 13
$I_o$ = Intensity of source radiation 12
$e$ = 2.71828
$(\mu/\rho)$ = Mass absorption coefficient of steel plate P
$\rho$ = Density of steel plate P
$t$ = Thickness of steel plate P A portion of emergent radiation 13 is absorbed by scintillator 14 which converts gamma photon energy into light source 15 that varies proportional to said radiation and therefore nonlinearly to the thickness of plate P. Sodium and caesium iodide crystals are efficient and acceptable scintillators. However, in addition to being costly, they have phosphorescent, or afterglow, characteristics which detract from meeting fast recovery requirements. The best results with regards to low noise and high speed of response are obtained by using the largest possible detector area and a non-phosphorescent material. Ruggedness to a steel rolling mill environment and reduced costs are other considerations. In view of the foregoing, it is preferred to use a non-phosphorescent doped plastic as supplied by Nuclear Enterprises, Inc., San Carlos, California, their type 110, as the material for scintillator 14. A cube shape is preferred rather than a conventional wafer, which is shown in FIG. 1 for the sake of simplicity, although other shapes will function satisfactorily.

In practice, cubic scintillator 14 is aligned so that one of its faces is perpendicular to emergent radiation 13. Light source 15 is optically coupled to controlled-gain photodetector 16 which is positioned against a cube face perpendicular to the first face and the remainder of the entire surface of scintillator 14 is made lightproof. With this arrangement, the unabsorbed portion of high energy radiation passes through a cube face opposite to the first face and into an absorber material.

Both scintillator 14 and photodetector 16 are located as an assembly above a window in an environmentally-controlled upper portion of a C-shape gage housing not shown. Radiation source 10 and shutter and calibration standards housing 11 are located beneath a window in the lower portion of the gage housing and so positioned that radiation beam 12 is directed toward, and aligned with scintillator 14. The gage housing is dimensioned so that the gage between the upper and lower portions will accommodate plate P in a horizontal plane, and further, be adapted to be stationary when plate P moves, or alternatively, is adapted to transverse plate P during gaging operations.

Controlled-gain photodetector 16 includes photomultiplier tube 17 which converts light source 15 into an electrical signal. It is preferred that photomultiplier tube 17 have a low dark current and about 10-dynodes, such as an EMI type 9656, or equal. Conversion is accomplished by imaging light source 15 on photocathode 18 which is connected to one end of first dynode resistor 19 and to a dynode energizing voltage which is varied as described below. The other end of resistor 19 is circuited to conventional voltage divider network 20 which has a plurality of taps connected to dynode string 21 and is terminated at ground through resistor 22. Current from the photomultiplier tube's anode 23 is conducted through high-impedance load resistor 24 to ground. The voltage drop produced across load resistor 24 is fed to operational type of preamplifier 25, which includes a suitable feedback resistor 26, and produces a voltage at photodetector 16 output on lead 27.

It should be noted that constant resistance circuits are maintained through dynode voltage divider network 20 and resistor 22 to ground, and through anode load resistor 24 to ground, thereby providing simplified photomultiplier tube 17 circuitry while maintaining constant operating characteristics throughout a single, wide range of gage measurements, as well as providing better operating stability and improved accuracy. There is no regulator in the dynode voltage divider network 20, or a nonlinear network in place of resistor 24, to cause corrective signal variations as is done in some prior art optical densitometers which use photomultiplier tubes in similar measuring circuits. Such measuring circuits are not to be confused with those of the present invention since optical densitometers operate on the basis of the Beers-Lambert law which states that optical density, or absorbence, $A = \log 10\ 1/T$, where $T$ is the transmittance of the absorbing material. Whereas, the present thickness gage has as a basis of operation Lambert's law, modified for x-ray and nuclear radiation, which relates to the absorption phenomenon as defined by equation (1).

The photomultiplier tube 17 inverse phenomenon mentioned above will now be described.

Photocathode 18 converts light source 15 into a source of electrons which varies proportional to light intensity. These electrons are collected by the string of dynodes 21 which have good secondary emission. By applying the variable energizing voltage to the string of dynodes 21, an exponential or nonlinear current gain is exhibited by photomultiplier tube 17, this phenomenon being illustrated graphically in FIG. 3. Photomultiplier tube 17 current gain is expressed as:

$$G_i = K_1\ V^{nk_2} \text{ where:} \tag{2}$$

$G_i$ = Current gain
$K_1$ = Proportionality constant
$V$ = Interdynode voltage, i.e., dynode energizing voltage
$n$ = Number of dynodes
$K_2$ = Tube constant Since the photocathode 18 current ($i_p$) will be proportional to the intensity of emergent radiation 13, i.e., I in equation (1), the relationship exists:

$$i_p = KI \quad (3)$$

The anode 23 current ($i_a$) will then be the product of tube gain ($G_t$) and photocathode 18 current and expressed as:

$$i_a = (G_t)(i_p)$$
$$= (G_t)(KI) \quad (4)$$

Substituting the relationships already developed in equations (1) and (2), the following envolves:

$$i_a = (K_1 V^{nk2})(KI_o e - (\mu/\rho)(\rho t)) \quad (5)$$

Further, if the anode 23 current ($i_a$) is considered to be held constant and a solution for V is sought, then:

$$V^{nk2} = (i_a/ K_1 KI_o) e (\mu/\rho) \rho t \quad (6)$$

By combining constants and simplifying, the following general relationship exists:

$$V = C_1 e^{c2t} \quad (7)$$

From equation (7) it can be seen that an exponential or nonlinear relationships exists relationship the thickness of plate P in radiation beam 12 and the energizing voltage applied to the string of dynodes 21 in photomultiplier tube 17, it being considered that photomultiplier tube 17 is operated in a constant anode current mode as is done herein. This relationship establishes photodetector 16 as a controlled-gain photodetector having a nonlinear gain characteristic inverse and nearly equal the nonlinear characteristic of light source 15. This relationship is not only true for material property such as plate P thickness, but such properties as weight per unit area and density as well.

In order to provide the variable energizing voltage for dynode string 21, controlled-gain photodetector 16 is operated in a feedback loop which includes light source 15, comparator 28 and a servo-variable high voltage source described below. Comparator 28 consists of summing amplifier 29, having a suitable feedback resistor 30, and an internal reference voltage source (not shown) adjusted by potentiometer 31. Photodetector 16 output voltage on lead 27 is fed through resistor 29a to one input of amplifier 29 where it is combined with the sum of the feedback voltage across resistor 30 and the reference voltage source. The other input of amplifier 29 is grounded. Potentiometer 31 is adjusted initially when there is no plate P in radiation beam 12 so that a zero error voltage will appear at the output of amplifier 29 and on lead 32, thereby establishing operating point 33 on the curve in FIG. 3. The error voltage on lead 32 also constitutes the output of comparator 28. Potentiometer 31 is later adjusted periodically to offset a shift in operating point 33 due to ageing of photomultiplier tube 17 and other causes.

The feedback loop also includes servo-variable voltage source 34 which comprises null-balance servo system 35, and stable high voltage source 36 having a 1000 V. DC rating and a positive ground, such as FLUKE Model No. 412B. Servo system 35 includes servo amplifier 37 receiving the error signal on lead 32, servo motor 38 energized by amplifier 37, and multi-turn high-resolution potentiometer 39 connected across high-voltage source 36. Potentiometer slider 40 is driven by servo motor 38. Lead 41 is connected to slider 40 and provides a variable negative energizing voltage to photocathode 18 and dynode string 21 by way of focusing potentiometer 19, voltage divider network 20 and resistor 22 to ground.

A fractional portion of the variable energizing voltage for dynode string 21 is developed by attenuating the voltage on potentiometer slider 40 by a factor of about 0.025 in voltage divider 42. The attenuated voltage appears on lead 43 and its use will be described below.

Servo variable voltage source 34 is circuited internally and in the feedback loop so that whenever a change in plate P thickness occurs, thus causing a change in light source 15 intensity to occur, anode 23 current flow changes momentarily. This causes the momentary production of an error voltage on lead 32, thereby causing servo motor 38 to rotate and the dynode energizing voltage on lead 41 to vary in such manner as to restore and maintain anode 23 current at a substantially constant value. As a result of the null-seeking action of servo system 35, the error voltage on lead 32 is reduced to virtually zero when the feedback loop stabilizes, thereby causing the servo system to remain at a new balance point and the dynode energizing voltage on lead 41 to remain at a constant new value representing the present thickness of plate P.

When using the exemplified photomultiplier tube 17 and adjusting the reference voltage potentiometer 31 so that operating point 33 is established when anode 23 current flow is about 20 nanoamps., then the dynode energizing voltage on lead 41 is caused to vary between about −900 volts and about −300 volts when light source varies from light to dark, or in other words, when plate P thickness varies over a wide range from zero to maximum value. In the present embodiment, this range would be from zero to three inches thickness of plate P.

Ideally, it would be desirable if in actual practice the degree of differences in exponential or nonlinear relationships of the inverse phenomena defined by equations (1) and (2) would result in equation (7) representing a linear function, that is, dynode energizing voltage varying linearly with variations in thickness of plate P. This would enable simplification of gaging circuitry even further than has been shown in FIG. 1. However, as is often the case in actual practice, it has been found that up to about 4 percent nonlinearity is experienced at full scale when using equation (7) over a single wide range of measurement as is done herein. That is, during operation of controlled-gain photodetector 16, the dynode energizing voltage on lead 41 varies slightly nonlinearly as the thickness of plate P varies from zero to three inches. This slightly nonlinear relationship is illustrated graphially in FIG. 4, curve A, and also occurs in the fractional portion of the dynode energizing voltage appearing on lead 43. The voltage on lead 43 will hereinafter be referred to as the nonlinear thickness voltage.

Still referring to FIG. 1, in order that the nonlinear thickness voltage on lead 43 may be used to provide a linear, direct-reading indication over a wide range of plate thickness, several additional operations are performed on the nonlinear thickness voltage which include zeroing, linearizing, scaling, compensating for variations in plate P composition and/or temperature, and converting the resulting voltage into digital linear indications of plate P thickness. Selective by-passing has been provided for some of these additional operations where in other applications of the discovery of the present invention their inclusion is deemed neither necessary nor desirable.

Zero control 44 provides means for establishing a gage zero signal and consists essentially of a comparator having an operational summing amplifier 45, a suitable feedback resistor 46, and an internal reference voltage source (not shown) adjusted by potentiometer 47. Operational amplifier 45 has one input grounded and the other input circuited to receive the sum of the nonlinear thickness voltage on lead 43 by way of resistor 45a, the feedback voltage and the reference voltage. Potentiometer slider 48 is adjusted initially so that the reference signal is equal to the nonlinear thickness voltage without any plate P in radiation beam 12, thereby causing a zero-based nonlinear thickness signal to appear at the output of amplifier 45 and on lead 49, said voltage being illustrated graphically in FIG. 4, curve B.

From time to time during normal rolling mill operations foreign matter becomes lodged on the windows in the upper and lower portions of the above-mentioned gage housing. This has the effect of producing an offset in gage zero and will contribute an error to thickness measurements unless a correction is made. For this reason the gaging apparatus herein is provided with automatic zero adjusting means 50 for continuously adjusting gage zero when there is no plate P being gaged. Means 50 includes material detector 51 which has a level comparator 52 receiving the nonlinear thickness voltage on lead 49 and energizes relay 53 only when the thickness voltage exceeds a nominal preset value above zero, thereby indicating a plate P being in the gage.

Means 50 also includes an automatic zero adjuster 54 which receives the nonlinear thickness voltage on lead 49 and is controlled by relay contact 53a, the latter being normally closed without plate P in the gage and opens when plate P is being gaged. The zero controlled thickness voltage is passed through summing resistor 55 and into operational amplifier 56, the latter having a suitable feedback resistor 57. The output of amplifier 56 is passed through resistor 58 to drive meter 59 which is a highly damped, center-zero, dual set point, contact making, milliameter calibrated in thousandths of an inch of plate P thickness. When amplifier 56 output current exceeds meter 59 high or low set points for a sustained period, thus indicating the actual presence of some material in radiation beam 12, then stepping motor 60 is energized in the proper direction to drive slider 48 on zero control potentiometer 47 to cause the nonlinear thickness voltage on lead 49 to approach zero. Since stepping motor 60 moves in discrete steps, the zero adjusting arrangement is not a null seeking servo, but one which drives only so the set limits on meter 59 are not exceeded.

In instances where the gaging apparatus is adapted to traverse plate P, and the gaging apparatus installation is provided with an off-line or non-gaging position, then material detector 51 may be eliminated and a limit switch closed only by gage movement to the off-line position may be substituted for relay contact 53a to control automatic zero adjuster 54 when no plate P is being gaged.

Turning now to linearizer 61, the zeroed slightly nonlinear thickness voltage appearing on lead 49, and shown in FIG. 4, curve B, is fed to function generator 62 which includes a suitable feedback resistor 63. Function generator 62 consists of a breakpoint, ten-segment diode/resistor network, such as Philbrick Researches, Inc., model No. SPFX-P. By properly adjusting the diode breakpoints, function generator 62 generates a correction voltage that is more nonlinear, lower in amplitude and opposite in polarity to the thickness voltage on lead 49 and is shown graphically in FIG. 4, curve C. An operational amplifier 64 having one input grounded, and another input receiving the correction voltage produced by function generator 62, is circuited to function as a current-to-voltage converter and produces the correction voltage, FIG. 4, curve C. This voltage is passed through normally closed switch 66 and summing resistor 67 to summing junction 68 where a ratio of one part in about twenty of it is subtracted from the slightly nonlinear thickness voltage on lead 49, the latter being fed directly to summing junction 68 by way of summing resistor 69. As a result, a linear thickness voltage is generated at summing junction 68, which is shown in FIG. 4 as straight line D, and is considered as the linearizer 61 output signal.

In practice, function generator 62 is adjusted by sequentially inserting thickness calibrating standards at plate P location into radiation beam 12 and adjusting corresponding breakpoints until linearizer 61 output voltage is linear within system accuracy limits from zero to full scale. Other system nonlinearities such as those introduced by time-dependent variations in source 10 and photomultiplier tube 17 can be accommodated by function generator 62 adjustments because the linearizing function is separated entirely from the photometric function of photomultiplier tube 17 and its balancing loop.

It would of course have been possible to linearize the thickness voltage on lead 49 by operating on it only with function generator 62, rather than subtracting a generated nonlinear correction voltage from the inverse nonlinear thickness voltage on lead 49. However, since the excursion of the nonlinear thickness voltage on lead 49 (FIG. 4 curve B) from a straight line (FIG. 4 straight line D) is about 4 percent at full scale thickness, a more stable system results by keeping the adjustable elements of function generator 62 in a by-pass line to summing junction 68 where any variation in function generator 62 characteristics will cause only a minor change in output thickness voltage and have little effect on output accuracy after initial calibration.

In some applications where for some reason or another it is not desired to linearize zeroed voltage on lead 49, the effects of linearizer 61 may be selectively by-passed by opening normally closed switch 66 in the by-pass line to summing junction 68, thereby feeding only the zeroed voltage on lead 49 through resistor 69 to summing junction 68 so that no correction takes place.

In regards to scaling, the linearized thickness signal at summing junction 68 (FIG. 4 straight line D) is fed to span control 70 which includes operational summing amplifier 71 with one input grounded and another input receiving the linearized thickness signal. Amplifier 71 is provided with a suitable adjustable feedback potentiometer 72 which functions as a span adjust to vary the gain of amplifier 71 such that the output thereof, and therefore the output of span control 70, will be in engineering units as desired. In the present gage, span control 70 is adapted to provide a direct conversion from 3.000 inches thickness of plate P to an output thickness voltage of 3.000 volts on lead 73.

Still referring to FIG. 1, thickness signal conditioner 74 having composition and temperature compensation features for accommodating complex corrective functions will now be described. Ordinarily in laboratory types of radiation thickness gages, the composition, or density, of steel plate P is considered constant as is plate temperature. However, in hot steel plate rolling mills, plate composition is considered constant only for a given plate because throughout daily production runs the plate-to-plate variation in composition, or density, from calibration standards may require as much as plus or minus 10 percent correction of the linear thickness voltage. Similarly, in mill practice plate P temperature is considerably above the 70° F. gage calibration standard, more particularly, in a range of about 1100° F. to about 2200° F. In addition, plate P temperature varies during rolling and gaging due to changing plate cooling effects. Plate cooling effects are governed by plate composition, temperature and cooling rate, and ambient environmental conditions, and these effects may differ from plate to plate. As will be explained more fully below, variations in plate P temperature cause variations in both the plate's physical and metallurgical properties and these variations also cause plate P density to vary, thus causing a variation in the amount of radiation from beam 12 absorbed by plate P. In practice, plate P temperature variations may require up to about 10 percent additional correction of the linear thickness voltage.

A general understanding of the basic reasons for providing complex composition and temperature compensation of a material thickness signal may be had from the teachings of E. L. Mangan in U.S. Pat. No. 3,482,098. It is to be understood that these teachings are directed to a thickness deviation gaging system instead of a thickness gaging system, to an x-radiation source rather than a high energy nuclear source as the radiation source for gaging, to the gaging of hot steel strip rather than hot steel plate, and that the scaling up of these teachings do not necessarily follow in every respect.

In the present embodiment, thickness signal conditioner 74 receives the linear thickness voltage on lead 73 and branches it into composition compensator 75 where the linear thickness voltage is modified for variations therein caused by variations in composition of plate P. Variations in composition of plate P cause variations in plate density and, as will be observed from equation (1), variations in density also affect the mass absorption coefficient, whereby the combined effects of such variations require a complex corrective function. However, stated somewhat simply, the percent correction of the linear thickness voltage as a function of plate P composition is expressed as follows:

Percent Composition Correction $= \pm p k_3$ 100 where (8)

$p =$ density, or composition, of plate P
$k_3 =$ composition coefficient of plate P, either a plus or minus value when referenced to a composition calibration standard.

Composition coefficient ($k_3$) of steel plate P varies as a predetermined function of plate density and density effects on the mass absorption coefficient. Thus, a percentage composition correction of the linear thickness signal on lead 73 must be selected accordingly.

Percentage composition correction of the linear thickness voltage on lead 73 is accomplished by feeding the linear thickness voltage through summing resistor 76 and into operational amplifier 77 where, by means of an adjustable feedback network 78, the linear thickness voltage is multiplied by a positive or negative percentage correction factors selected according to equation (8). Adjustable feedback network 78 consists of resistor 79, linear potentiometer 80 and resistor 81 series-connected across amplifier 77, and a SPDT polarity selector switch 82 having negative (−) and positive (+) poles also connected across amplifier 77, the common pole of switch 82 being connected to potentiometer slider 83. In one arrangement linear potentiometer 80 may be a ten-turn precision analog device and slider 83 provided with a calibrated dial. In another arrangement, potentiometer 80 may be a digital device having thumb-wheel selectors operated under control of a gaging operator as is switch 82. Or alternatively, both digital potentiometer 80 and polarity selector switch 82 may be relay controlled in response to the action of a computer described below.

A composition compensation range of plus or minus 10 percent is established by limiting the resistance value of potentiometer 80 and resistor 81 to 0.1 and 0.9 that of resistor 79, respectively. Thus, when setting potentiometer slider 80a at 0 percent correction and turning polarity selector switch from (+) to (−) position, the gain of amplifier 77 will remain at unity and the linear thickness voltage will not be multiplied by any percentage factor. However, when setting potentiometer slider 80a at any value up to 10 percent, and turning selector switch 82 to either a (+) or (−) position, then the gain of amplifier 77 will be set up to 1.1 or down to 0.9, respectively, thus multiplying the linear thickness voltage by up to plus or minus 10 percent, respectively. The output of amplifier 77 provides the output for composition compensator 75 and this output appears on lead 83.

Data source 84 is provided to determine the position of, and if desired to actuate, composition polarity selector switch 82 and the percentage setting of potentiometer slider 80a, or its equivalent, for compensating the linear thickness voltage the correct composition percentage as determined from equation (8). Prior to gaging, the percentage and polarity of composition correction data is pre-calculated and tabularized for each different type of plate P composition expected to be gaged. When using either the analog form or the thumb wheel digital form of potentiometer 80 in composition compensator 75, the tabular correction data may be in chart form suitable for a gage operator to read and cause manipulation of switch 82 and potentiometer slider 80a to required percentage correction positions corresponding to a known composition of plate P. When using the digital relay form of potentiometer 80, the relays may be controlled in response to tabular data stored in a computer incorporated, but not shown, in data source 84.

Thickness signal conditioner 74 also includes temperature compensator 85 for modifying the composition-compensated linear thickness signal on lead 83 for variations therein caused by variations in temperature of plate P. As noted above, the amount of radiation absorbed by steel plate P is a function of the mass of steel plate P in radiation beam 12. When plate P is at a temperature elevated above room temperature it expands volumetrically, i.e., in three dimensions, thereby causing a portion of the mass which has expanded in the plane perpendicular to radiation beam 12 to leave the beam and not be available for energy absorption. This effect of changing mass results in plate P appearing thinner to radiation beam 12 than when at room temperature, thus requiring a positive correction to be made in the composition-compensated linear thickness voltage. Referring to equation (1), it will be observed that variations in plate mass which are occasioned by variations in plate temperature also cause variations in plate density and mass absorption coefficient which also require a complex corrective function. Here too, stated somewhat simply, percent temperature correction as a function of plate P temperature is expressed as follows:

Percent temperature correction $= 2\, Ta\, 100$ where: (9)

T = plate P temperature in degrees F.
a = coefficient of linear expansion for plate P at temperature T.

Density of steel plate P varies as a predetermined function of plate chemical composition, plate temperature and rate of cooling. It is well known that steel is a crystalline structure and that the behavior of such structures changes at elevated temperatures. Further, that the degree of change and temperature at which such changes occur varies widely, depending on the chemical composition, temperature and rate of cooling of the steel. In one example of such phenomena, a steel plate P having known amounts of iron, carbon and other alloying elements, a known elevated temperature and a desired rate of cooling, will exhibit density versus temperature properties as illustrated graphically in FIG. 5, curve A. Other steel alloys, as well as other materials, will differ in curvature, slope and starting point.

When interpreting FIG. 5 curve A, a sharp reversal in curvature occurring at point 86 will be noted. This reversal occurs at what is known as the transformation temperature of steel plate P. That is, the temperature at which a change in phase occurs in the steel alloy structure, for example, when austenite which formed during heating changes to ferrite upon cooling or to ferrite plus cementite when cooling is completed. There are transformation temperature ranges, that is, ranges of temperatures at which austenite forms during heating and transforms into ferrite, etc. during cooling. The heating and cooling temperature ranges are distinct, sometimes overlap but never coincide, and the cooling ranges are lower than the heating ranges. The limiting temperatures of each range depend on the composition of the steel alloy and on the rate of change of temperature, particularly during cooling. In addition, when accommodating a wide range of steel alloys, the transformation temperature range varies in span and location along the temperature axis in FIG. 5, curve A; the location of the transformation temperature, i.e., point 86, varies along the temperature axis and sometimes occurs at a temperature of less than 1100° F.; the starting point and initial slope of curve A at 1100° F., as well as the vertical separation at point 86 and the final slope of curve A, all vary in magnitude with chemical composition and cooling rate of steel plate P.

All of the foregoing variable factors establish the metallurgical properties of steel plate P which affect its density. Variations in metallurgical properties, together with the above-noted variations in the physical property of steel plate P due to mass redistribution from volumetric expansion, make up the total variations in density over a given temperature range and are operative in determining a particular value of coefficient ($a$) in equation (9) for a given steel plate P. Thus, it will become apparent that to accommodate a variety of steel alloys, and other materials, the specific percentage correction applied by temperature compensator 85 to the composition-compensated linear thickness voltage on lead 83 must be determined from a data source covering a number of physical and chemical properties of a variety of materials to be gaged. Also, temperature compensation must be applied over a given range, such as between a low limit of about 1100° F. and a high limit of about 2200° F. as experienced in a hot steel plate rolling mill.

Provisions are made in temperature compensator 85 for a high degree of flexibility in establishing the independent selection of either positive or negative percent temperature compensation applied at the low and high temperature limits, as well as in establishing the starting and ending percentages of correction at said temperature limits, thereby enabling the establishment of any rate, or rate change, of temperature compensation required within predetermined percentage correction limits. Provisions are also made for proportioning the percentage temperature compensation established between temperature limits according to an actual temperature measurement of plate P at any time during gaging.

The correction function of temperature compensator 85 is accomplished by feeding the composition-compensated linear thickness voltage on lead 83 through selector switch 87, position "$a$," and by means of dual circuitry thereafter, passing it through summing resistors 88 and 89 and into low-and-high-limit operational summing amplifiers 90 and 91, respectively. Adjustable feedback circuits connected across amplifiers 90 and 91 are provided by way of fixed resistors 92 and 93 and linear potentiometers 94 and 95 serially connected with resistors 92 and 93, respectively. Potentiometers 94 and 95 may consist of either of the precision analog or digital devices referred to in the description of potentiometer 80. Potentiometer sliders 96 and 97 establish low-limit and high-limit gain values of amplifiers 90 and 91, respectively, and are set according to provisions of data source 84 as will be explained below, whereby the composition-compensated linear thickness voltage on lead 83 is multiplied by positive or negative percentage correction factors selected according to equation (9).

When properties of the material being gaged require a positive maximum of say 10 percent temperature correction, the resistance value of potentiometers 94 and 95 should be 0.1 that of resistors 92 and 93, respectively. By adjusting the low-limit and high-limit potentiometer sliders 96 and 97, the gain of amplifiers 90 and 91, respectively, is set above unity at, for example, 2 and 4 percent temperature correction, respectively. This type of correction is illustrated graphically in FIG. 5, curve B, where the best-fit straight line temperature correction is applied to the composition-compensated linear thickness voltage as required for the density versus temperature properties of the particular steel plate P illustrated in FIG. 5, curve A. Other steel alloys, as well as other materials, may require different settings of potentiometer sliders 96 and 97.

When properties of the material being gaged require a positive temperature correction factor having a negative rate of change between low-and-high-temperature limits, then potentiometer slider 96 and 97 settings may be reversed to say 4 and 2 percent, respectively.

Further, when properties of the material being gaged require a negative maximum of say 10% temperature correction, then the resistance values of resistors 92 and 93 are only 0.9 of that required for positive correction. This arrangement permits the gain of amplifiers 90 and 91 to be adjusted between unity and 0.9 to establish a negative percent temperature correction at either the low- or the high-limit of temperature correction. The inverse of FIG. 5, curve B, would illustrate this type of correction. In addition, a reverse slope of curve B can be obtained by adjusting the percentage relationship of potentiometer sliders 96 and 97 as noted above.

Regardless of what the feedback circuit parameters are, the outputs of low-limit and high-limit operational amplifiers 90 and 91 are fed to opposite ends of precision linear potentiometer 98. Potentiometer slider 99 is driven by temperature indicator 100, the latter being responsive to pyrometer 101, or other sensing device, which senses the temperature and temperature changes of steel plate P during gaging operations and sends a corresponding signal over lead 102 to indicator 100. As potentiometer slider 99 is moved from low- to high-limit position it proportions the outputs of low- and high-limit operational amplifiers 90 and 91, respectively. This provides the proper percent and rate of temperature compensation of the composition-compensated linear thickness voltage at the output of temperature compensator 85.

Data source 84 is also provided to determine the position of, and if desired to actuate, the percentage settings of potentiometer sliders 96 and 97, or their equivalent, for compensating the composition-compensated linear thickness voltage the correct temperature percentages as determined from equation (9). Prior to gaging, the percentage, and polarity if necessary, of temperature correction data is pre-calculated and tabularized for each different type of plate P composition, density versus temperature and cooling rate expected to be encountered during gaging. When using either the analog form or the thumb-wheel digital form of potentiometers 94 and 95 in temperature compensator 85, the tabular correction data may also be in chart form suitable for a gage operator to read and cause manipulation of potentiometer sliders 96 and 97 to low- and high-percentage correction positions corresponding to known properties of plate P. When using the digital relay form of potentiometers 94 and 95, the relays may be controlled in response to tabular data also stored in the unidentified computer in data source 84 as in the composition compensation noted above.

In some hot steel plate rolling mills the composition and cooling rate variations in plate P may be sufficiently small that such effects on temperature correction of the thickness signal are tolerable within prescribed gaging system accuracy limits. This will permit pre-setting of potentiometer sliders 96 and 97 initially and making necessary adjustments thereto only at the time of gage calibration. In other installations, the cooling rate of plate P may change after initial settings of potentiometer sliders 96 and 97 and during gaging of a particular plate P, thus requiring a change in position of either or both sliders to maintain the proper amount temperature correction of the thickness signal. For this reason a linear temperature signal is fed from temperature indicator 100 over lead 103 to data source 84. Here plate temperature and rate of temperature change may be indicated to a gage operator so that appropriate changes may be made in the positions of potentiometer slider 96 and/or 97 in order to produce the proper temperature compensation of the thickness signal. Alternatively, the linear temperature signal may be fed to the unidentified computer in data source 84 to determine plate temperature and rate of temperature change in order to effect the necessary changes in temperature compensation of the thickness signal.

Still referring to FIG. 1, the output from temperature compensator 85 is fed over lead 104, through selector switch 105, position "a" and into thickness indicator 106. Thickness indicator 106 is a digital voltmeter calibrated in terms of plate thickness over a single wide range from 0.0 to 3.000 inches in thousandths of an inch. Alternatively, the digital voltmeter 106 may be a recorder or a computer utilization device. In any event the thickness voltage received thereby is linearized and compensated for variations in composition and temperature of plate P.

In some applications of the present invention it may be desirable to omit the corrective effects on the linear thickness voltage produced by composition compensator 75 and/or temperature compensator 85. In such cases, composition compensator 75 may be by-passed by feeding the linear thickness voltage on lead 73 to selector switch 107, position a, through lead 108 and selector switch 87, position b, into temperature compensator 85, and ultimately to thickness indicator 106. Temperature compensator 85 may be by-passed by turning selector switches 105 and 107 to their b positions, thereby feeding the composition-compensated linear thickness voltage over lead 108 directly to thickness indicator 106. Both composition compensator 75 and temperature compensator 85 may be by-passed by turning selector switch 107 to position a and selector switch 105 to position b, thus feeding the linear thickness voltage on lead 73 over lead 108 directly to thickness indicator 106.

Turning now to FIG. 6, there is shown another controlled-gain photodetector operating in a feedback loop having an electronic servo for providing an alternate source of dynode voltage in place of the corresponding portion of the gaging apparatus embodiment shown and described in connection with FIG. 1. As in FIG. 1, the constant source of high-energy gamma radiation beam 12 is directed against steel plate P and a portion of emerging radiation 13, which varies according to equation (1), is absorbed by scintillator 14, thereby converting gamma photon energy into light source 15 which varies nonlinearly with the thickness of plate P.

Light source 15 is optically coupled to controlled-gain photodetector 109, which corresponds to photodetector 16, and includes photomultiplier tube 110 having the same structure and inverse operating characteristics as photomultiplier tube 17, whereby light source 15 is converted into an electrical signal representing the thickness of plate P as defined in equation (2) et seq. Conversion is accomplished by imaging light source 15 on photocathode 111 which is connected to first dynode resistor 112 and to an alternate dynode energizing source which is varied as described below. The other end of resistor 112 is circuited to conventional voltage divider network 113 which has a plurality of taps connected to dynode string 114 and is terminated at ground through resistor 115. Current from the photomultiplier's anode 116, instead of being circuited through a load resistor to ground, is conducted directly to the input of high impedance operational amplifier 117 which is connected as a current-to-voltage transducer, the photomultiplier tube's internal resistance constituting the input resistance of amplifier 117. Amplifier 117 includes a suitable feedback resistor 118 and smoothing capacitor 119 thereacross, thereby providing a thickness related voltage representing photodetector 109 output at lead 120. This circuit arrangement provides minimum loading of photomultiplier tube 110 and reduces amplifier 117 noise effects over those of the conventional potentiometer types of current sensing.

It should be noted that controlled-gain photodetector 109 also has constant resistance circuits maintained through dynode voltage divider network 113 and resistor 115 to ground, and from anode 116 through amplifier 117 to ground, thereby providing simplified photomultiplier tube 110 circuitry while maintaining constant operating characteristic throughout a single, wide range of gage measurements, as well as providing better operating stability and improved accuracy.

Referring now to equation (7), it will be observed that an exponential or nonlinear relationship also exists between the thickness of plate P in radiation beam 12 and the energizing voltage applied to dynode string 114 in photomultiplier tube 110, it being considered that photomultiplier tube 110 is operated in a constant anode current mode as is also done herein. This relationship establishes photodetector 109 as a controlled-gain photodetector having a nonlinear gain characteristic inverse and nearly equal the nonlinear characteristic of light source 15. In order to provide the variable energizing voltage for dynode string 114, controlled-gain photodetector 109 is also operated in a feedback loop which includes light source 15, comparator 121 and an electronic-servo variable high voltage source described below. Comparator 121 consists of a summing amplifier 122 having a suitable feedback resistor 123 and a smoothing capacitor 124, and an internal reference voltage source (not shown) adjusted by potentiometer 125. The voltage on lead 120 is fed through resistor 122a to one input of amplifier 122 where it is combined with the sum of the feedback voltage from resistor 123 and the reference voltage source. The other input of amplifier 122 is grounded. Potentiometer 125 is adjusted initially when no plate P is in radiation beam 12 so that a zero error voltage will appear at the output of amplifier 122 and on lead 126, thereby establishing operating point 33 on the curve in FIG. 3. The error voltage on lead 126 also constitutes the output of comparator 121.

The feedback loop also includes voltage-controlled high voltage source 127 such as KEPCO Model No. OPS1000 having a positive ground and a negative high voltage output which is varied up to 1000 volts D.C. by the error voltage on lead 126. Source 127 consists of a high voltage operational amplifier which receives and highly amplifies the error voltage on lead 126. It also functions as an electronic servo in the feedback loop when its negative high voltage output is fed over lead 128 to photocathode 111 and dynode string 114.

Thus, when photomultiplier tube 110 has about the same voltage and current flow characteristics as photomultiplier tube 17, the feedback loop overall gain is adapted to be about $10^{12}$ and the gaging system first energized, there is no output signal from photomultiplier tube 110. As a result, the reference voltage in comparator 121 drives high voltage source 127 negative output voltage to its maximum limit and this voltage energizes dynode string 114. As anode 116 current begins to flow a thickness related voltage is developed at lead 120 and applied to one of the inputs of amplifier 122 in comparator 121. Since the reference voltage in comparator 121 and the thickness related voltage are of opposite polarity, the net voltage resulting will be a reducing one and this is the error voltage on lead 126 that is applied to the control input of high voltage source 127. As the error voltage reduces, so does the high voltage source output on lead 128 reduce. This reduction will continue until the error voltage on lead 127 is reduced to substantially, but not virtually, a zero value. However, because of the high feedback loop gain, the substantially zero value is of sufficient value to be amplified in source 127 and cause said source to hold its high voltage output at a fixed value, thus causing the feedback loop to stabilize.

When plate P is placed in radiation beam 12 the feedback loop becomes unstable momentarily until a new error voltage on lead 126 is developed and later becomes stabilized at a value slightly higher than substantially zero by action of the electronic servo. As plate P thickness is varied over a wide range of say 0.0 to 3.000 inches, anode 116 current flow varies 0.1 nanoamp. and the high voltage source 127 output to dynode string 114 varies slightly nonlinearly with plate P thickness as illustrated graphically in FIG. 4, curve A. The dynode voltage on lead 128 is fed to voltage divider network 129 where a portion thereof is developed and fed as a nonlinear thickness voltage to the remainder of the gaging system as in the embodiment of FIG. 1. With one exception this voltage would be the same as appears on lead 43 and that which is fed to zero control 44. The one exception is that because the error voltage on lead 126 is amplified in source 127 to provide the high voltage on lead 128 for energizing dynode string 114, there is an error producing zero shift in the error voltage which is proportional to the thickness range of the gaging apparatus. Thus, the substantially zero error voltage in fact varies a slight known amount which is proportional to the magnitude of photodetector 109 output voltage and electronic servo gain, or in other words, proportional to feedback loop gain. This source of error may be accounted for with a suitable adjustment to span control 70, and if additional nonlinearity of the thickness signal develops, this source of error may be accounted for by adjusting the break points in function generator 62.

We claim:

1. In a material measuring system which converts radiation into a nonlinear light source as a function of a material property, wide-range photoelectric gaging apparatus comprising:
   a. a controlled-gain photodetector having a nonlinear gain characteristic inverse and nearly equal to said nonlinear light source characteristic for producing a variable detector signal in response to variations in said light source and a gain controlling energizing signal,
   b. comparator means responsive to the difference between said detector signal and a comparator reference signal for producing an error signal,
   c. a variable source of gain-controlling energizing signal responsive to said error signal for varying photodetector gain to maintain said error signal at a predetermined minimum value over a wide range of operation and without changing photodetector circuit characteristics, said energizing signal varying slightly nonlinearly and representing a measure of said material property,
   d. circuit means, including linearizer means, receiving a fraction of said energizing signal for linearizing a slight nonlinearity in said fractional energizing signal without changing photodetector circuit or gain characteristics, and
   e. means for utilizing means (d) output signal to determine a linear value of said material property.

2. The apparatus of claim 1 wherein source (c) is controlled by an electromechanical servo operating in a feedback circuit in response to said error signal to maintain said error signal at a constant zero value.

3. The apparatus of claim 1 wherein source (c) is an electronic servo consisting of a high voltage operational amplifier adapted to amplifying said error signal to provide said energizing signal for maintaining said error signal at a substantially zero value, said value varying a slight known amount in proportion to the magnitude of detector signal and servo loop gain.

4. In a material measuring system which converts a radiation into a nonlinear light source as a function of a material property, wide-range photoelectric gaging apparatus comprising:
   a. a controlled-gain photodetector having a nonlinear gain characteristic inverse said nonlinear light source characteristic for producing a variable detector signal in response to variations in said light source and a gain controlling energizing signal,
   b. comparator means responsive to the difference between said detector signal and a comparator adjustable reference signal for producing an error signal,
   c. a variable source of gain-controlling energizing signal responsive to said error signal for varying photodetector gain to maintain said error signal at a predetermined minimum value over a wide range of operation and without changing photodetector circuit characteristics, said energizing signal varying and representing a measure of said material property,
   d. circuit means connected to a fraction of said energizing signal source for producing and automatically maintaining a zero-based gaging signal during the absence of material from said gage, and
   e. means for utilizing means (d) output signal to determine a value of said material property.

5. The apparatus of claim 4 wherein said circuit means (d) includes an adjustable zero control means responsive to said energizing signal for producing said zero-based gaging signal, and also includes a zero adjuster means acting on said zero control means for maintaining said zero-based gaging signal.

6. The apparatus of claim 5 wherein said circuit means (d) further includes material detector means connected to said zero control means and acting to limit operation of said zero adjuster means to the absence of said material from said gage.

7. In a material measuring system which converts a radiation into a nonlinear light source as a function of a material property, wide-range photoelectric gaging apparatus comprising:
   a. a controlled-gain photodetector having a nonlinear gain characteristic inverse said nonlinear light source characteristic for producing a variable detector signal in response to variations in said light source and a gain controlling energizing signal,
   b. comparator means responsive to the difference between said detector signal and a comparator adjustable reference signal for producing an error signal,
   c. a variable source of gain-controlling energizing signal responsive to said error signal for varying photodetector gain to maintain said error signal at a predetermined minimum value over a wide range of operation and without changing photodetector circuit characteristics, said energizing signal varying and representing a measure of said material property,
   d. circuit means connected to said energizing signal source and including material detector means for producing a gage control signal during the presence or absence of material from said gage, and
   e. means for utilizing means (d) output signal to determine a value of said material property.

8. In a material measuring system which converts radiation into a nonlinear light source as a function of a material property, said material subject to variations in one or more additional properties having a predetermined variable effect on measuring said material first property, wide-range photoelectric gaging apparatus comprising:
   a. a controlled-gain photodetector having a nonlinear gain characteristic inverse said nonlinear light source characteristic for producing a variable detector signal in response to variations in said light source and a gain controlling energizing signal,
   b. comparator means responsive to the difference between said detector signal and a comparator adjustable reference signal for producing an error signal,
   c. a variable source of gain-controlling energizing signal responsive to said error signal for varying photodetector gain to maintain said error signal at a predetermined minimum value over a wide range of operation and without changing photodetector circuit characteristics, said energizing signal varying and representing a measure of said material property,
   d. circuit means, including signal conditioner means, receiving a fraction of said energizing signal for modifying said fractional energizing signal in proportion to one or more external signal sources representing said additional properties of said material, thereby compensating said fractional signal for variations caused by variations in one or more of said additional properties of said material, and e. means for utilizing means (d) output signal to determine a value of said material first property.

9. The apparatus of claim 8 wherein said signal conditioner means includes compensator means responsive to one of said external signals for modifying said fractional energizing signal.

10. The apparatus of claim 9 wherein said compensator means is adapted to continuously modify said fractional energizing signal during gaging of said material for said first property.

11. The apparatus of claim 9 wherein said compensator means includes adjustable circuit means for establishing one or more limits to the modification of said fractional energizing signal caused by said external signal.

12. The apparatus of claim 11 wherein said one or more adjustable circuit means are adapted to be preset prior to material gaging.

13. The apparatus of claim 11 wherein one or more of said adjustable circuit means are adapted to be preset initially prior to material gaging and further adapted to be adjusted during material gaging in response to a derivative of said external signal.

14. The apparatus of claim 8 wherein said signal conditioner means includes one or more compensator means responsive to variations in a material temperature signal, a material density or composition signal, or a combination of these signals, for modifying said fractional energizing signal.

15. In a material measuring system which converts radiation into a nonlinear light source as a function of a material property, said material subject to variations in one or more additional properties having a predetermined variable effect on measuring said material first property, wide-range photoelectric gaging apparatus comprising:

a. a controlled-gain photodetector having a nonlinear gain characteristic inverse and nearly equal to said nonlinear light source characteristic for producing a variable detector signal in response to variations in said light source and a gain controlling energizing signal, b. comparator means responsive to the difference between said detector signal and a comparator reference signal for producing an error signal, c. a variable source of gain-controlling energizing signal responsive to said error signal for varying photodetector gain to maintain said error signal at a predetermined minimum value over a wide range of operation and without changing photodetector circuit characteristics, said energizing signal varying slightly non-linearly and representing a measure of said material first property, d. circuit means, including linearizer means, receiving a fraction of said energizing signal for linearizing a slight nonlinearity in said fractional energizing signal without changing photodetector circuit or gain characteristics, e. signal conditioner means for modifying said linearized fractional energizing signal in proportion to one or more external signal sources representing said additional properties of said material, thereby compensating said linearized fractional energizing signal for variations caused by variations in one or more of said additional properties of said material, and f. means for utilizing means (e) output signal to determine a linear compensated value of said material first property.

16. In a material measuring system which converts radiation into a nonlinear light source as a function of a material property, said material subject to variations in one or more additional properties having a predetermined variable effect on measuring said material first property, wide-range photoelectric gaging apparatus comprising:

a. a controlled-gain photodetector having a nonlinear gain characteristic inverse and nearly equal to said nonlinear light source characteristic for producing a variable detector signal in response to variations in said light source and a gain controlling energizing signal, b. comparator means responsive to the difference between said detector signal and a comparator reference signal for producing an error signal, c. a variable source of gain-controlling energizing signal responsive to said error signal for varying photodetector gain to maintain said error signal at a predetermined minimum value over a wide range of operation and without changing photodetector circuit characteristics, said energizing signal varying slightly nonlinearly and representing a measure of said material first property, d. circuit means connected to a fraction of said energizing signal source for producing and automatically maintaining a zero-based gaging signal during the absence of material from said gage, e. linearizer means receiving the output of circuit means (d) for linearizing a slight nonlinearity in said zero-based fractional energizing signal without changing photo-detector circuit or gain characteristics, f. signal conditioner means for modifying said linearized fractional energizing signal in proportion to one or more external signal sources representing said additional properties of said material, thereby compensating said linearized fractional energizing signal for variations caused by variations in one or more of said additional properties of said material, and g. means for utilizing means (f) output signal to determine a zero-based, linear and compensated value of said material first property.

17. Apparatus for gaging a material property over a wide range, comprising:

a. means for producing a constant source of penetrative radiation beamed at said material whereby emerging radiation varies according to a nonlinear absorption characteristic relative said material property, b. a scintillator for converting said nonlinear emerging radiation into a corresponding nonlinear light source as a function of said material property, c. a controlled-gain photodetector having a nonlinear gain characteristic inverse said nonlinear light source characteristic for producing a variable detector signal in response to variations in said light source and a gain controlling energizing signal, d. comparator means responsive to the difference between said detector signal and a comparator adjustable reference signal for producing an error signal, e. a variable source of gain-controlling energizing signal responsive to said error signal for varying photodetector gain to maintain said error signal at a predetermined minimum value over a wide range of operation and without changing photodetector circuit characteristics, said energizing signal varying and representing a measure of said material property, and f. means for utilizing means (e) output signal to determine a value of said material property.

18. The apparatus of claim 17 wherein means (a) includes a source of nuclear radiation.

19. The apparatus of claim 17 wherein means (a) includes a radioactive isotope as a source of radiation.

20. The apparatus of claim 17 wherein means (a) source of radiation is high-energy, preferably monoenergetic.

21. The apparatus of claim 17 including calibration standards adapted to be interposed between said source of radiation and said scintillator.

22. The apparatus of claim 17 wherein said scintillator is an organic plastic, preferably non-phosphorescent.

23. The apparatus of claim 17 wherein said scintillator is a crystal, preferably non-phosphorescent.

24. Apparatus for gaging a material property over a wide range, comprising:

a. means for producing a constant source of penetrative radiation beamed at said material whereby emerging radiation varies according to a nonlinear absorption characteristic relative said material property, b. a scintillator for converting said nonlinear emerging radiation into a corresponding nonlinear light source as a function of said material property, c. a controlled-gain photodetector having a nonlinear gain characteristic inverse and nearly equal to said nonlinear light source characteristic for producing a variable detector signal in response to variations in said light source and a gain controlling energizing signal, d. comparator means responsive to the difference between said detector signal and a comparator reference signal for producing an error signal, e. a variable source of gain-controlling energizing signal responsive to said error signal for varying photodetector gain to maintain said error signal at a predetermined minimum value over a wide range of operation and without changing photodetector circuit characteristics, said energizing signal varying slightly nonlinearly and representing a measure of said material property, f. circuit means, including linearizer means, receiving a fraction of said energizing signal for linearizing a slight nonlinearity in said fractional energizing signal without changing photodetector circuit or gain characteristics, and g. means for utilizing means (f) output signal to determine a linear value of said material property.

25. Apparatus for gaging a material property over a wide range, comprising:

a. means for producing a constant source of penetrative radiation beamed at said material whereby emerging radiation varies according to a nonlinear absorption characteristic relative said material property, b. a scintillator for converting said nonlinear emerging radiation into a corresponding non-linear light source as a function of said material property, c. a controlled-gain photodetector having a nonlinear gain characteristic inverse said nonlinear light source characteristic for producing a variable detector signal in response to variations in said light source and a gain controlling energizing signal, d. comparator means responsive to the difference between said detector signal and a comparator adjustable reference signal for producing an error signal, e. a variable source of gain-controlling energizing signal responsive to said error signal for varying photodetector gain to maintain said error signal at a predetermined minimum value over a wide range of operation and without changing photodetector circuit characteristics, said energizing signal varying and representing a measure of said material property, f. circuit means connected to a fraction of said energizing signal source for producing and automatically maintaining a zero-based gaging signal during the absence of material from said gage, and g. means for utilizing means (f) output signal to determine a value of said material property.

26. Apparatus for gaging a material first property over a wide range, said material subject to variations in one or more additional properties having a predetermined variable effect on gaging said material first property, said apparatus comprising:

a. means for producing a constant source of penetrative radiation beamed at said material whereby emerging radiation varies according to a nonlinear absorption characteristic relative said material property, b. a scintillator for converting said nonlinear emerging radiation into a corresponding non-linear light source as a function of said material property, c. a controlled-gain photodetector having a nonlinear gain characteristic inverse said nonlinear light source characteristic for producing a variable detector signal in response to variations in said light source and a gain controlling energizing signal, d. comparator means responsive to the difference between said detector signal and a comparator adjustable reference signal for producing an error signal, e. a variable source of gain-controlling energizing signal responsive to said error signal for varying photodetector gain to maintain said error signal at a predetermined minimum value over a wide range of operation and without changing photodetector circuit characteristics, said energizing signal varying and representing a measure of said material property, f. circuit means, including signal conditioner means, receiving a fraction of said energizing signal for modifying said fractional energizing signal in proportion to one or more external signal sources representing said additional properties of said material, thereby compensating said fractional signal for variations caused by variations in one or more of said additional properties of said material, and g. means for utilizing means (f) output signal to determine a value of said material first property.

27. Apparatus for gaging a material first property over a wide range, said material subject to variations in one or more additional properties having a predetermined variable effect on gaging said material first property, said apparatus comprising:
  a. means for producing a constant source of penetrative radiation beamed at said material whereby emerging radiation varies according to a nonlinear absorption characteristic relative said material property,
  b. a scintillator for converting said nonlinear emerging radiation into a corresponding non-linear light source as a function of said material property,
  c. a controlled-gain photodetector having a nonlinear gain characteristic inverse and nearly equal to said nonlinear light source characteristic for producing a variable detector signal in response to variations in said light source and a gain controlling energizing signal,
  d. comparator means responsive to the difference between said detector signal and a comparator reference signal for producing an error signal,
  e. a variable source of gain-controlling energizing signal responsive to said error signal for varying photodetector gain to maintain said error signal at a predetermined minimum value over a wide range of operation and without changing photodetector circuit characteristics, said energizing signal varying slightly nonlinearly and representing a measure of said material first property,
  f. circuit means, including linearizer means, receiving a fraction of said energizing signal for linearizing a slight nonlinearity in said fractional energizing signal without changing photodetector circuit or gain characteristics,
  g. signal conditioner means for modifying said linearized fractional energizing signal in proportion to one or more external signal sources representing said additional properties of said material, thereby compensating said linearized fractional energizing signal for variations caused by variations in one or more of said additional properties of said material, and
  h. means for utilizing means (g) output signal to determine a linear compensated value of said material first property.

28. Apparatus for gaging a material first property over a wide range, said material subject to variations in one or more additional properties having a predetermined variable effect on gaging said material first property, said apparatus comprising:
  a. means for producing a constant source of penetrative radiation beamed at said material whereby emerging radiation varies according to a nonlinear absorption characteristic relative said material property,
  b. a scintillator for converting said nonlinear emerging radiation into a corresponding nonlinear light source as a function of said material property,
  c. a controlled-gain photodetector having a nonlinear gain characteristic inverse and nearly equal to said nonlinear light source characteristic for producing a variable detector signal in response to variations in said light source and a gain controlling energizing signal,
  d. comparator means responsive to the difference between said detector signal and a comparator reference signal for producing an error signal,
  e. a variable source of gain-controlling energizing signal responsive to said error signal for varying photodetector gain to maintain said error signal at a predetermined minimum value over a wide range of operation and without changing photodetector circuit characteristics, said energizing signal varying slightly non-linearly and representing a measure of said material first property,
  f. circuit means connected to a fraction of said energizing signal source for producing and automatically maintaining a zero-based gaging signal during the absence of material from said gage,
  g. linearizer means receiving the output of circuit means (d) for linearizing a slight nonlinearity in said zero-based fractional energizing signal without changing photo-detector circuit or gain characteristics,
  h. signal conditioner means for modifying said linearized fractional energizing signal in proportion to one or more external signal sources representing said additional properties of said material, thereby compensating said linearized fractional energizing signal for variations caused by variations in one or more of said additional properties of said material, and
  i. means for utilizing means (h) output signal to determine a zero-based, linear and compensated value of said material first property.

29. Apparatus for gaging a wide range of material thicknesses, comprising:
  a. means for producing a constant source of penetrative radiation beamed at said material whereby emerging radiation varies according to a nonlinear absorption characteristic relative said material property,
  b. a scintillator for converting said linear emerging radiation into a corresponding non-linear light source as a function of said material property,
  c. detector means including a photomultiplier tube optically coupled to said nonlinear light source and having a nonlinear gain characteristic inverse and nearly equal to said nonlinear light source, said detector means adapted to produce a variable detector voltage proportional to photomultiplier anode current in response to variations in said light source and a gain controlling dynode voltage,
  d. comparator means responsive to the difference between said detector voltage and a comparator reference voltage for producing an error voltage,
  e. a variable source of dynode voltage acting in response to said error voltage for varying photomultiplier gain to maintain said error voltage at a predetermined minimum value over a wide range of operation and without changing photomultiplier circuit characteristics, said dynode voltage varying slightly nonlinearly and representing a measure of material thickness,
  f. circuit means, including linearizer means, receiving a fraction of said dynode voltage for linearizing a slight nonlinearity in said fractional dynode voltage without changing photomultiplier circuit or gain characteristics, and
  g. means for utilizing means (f) output signal to determine a linear value of material thickness.

30. Apparatus for gaging a wide range of material thicknesses during variations in one or more additional properties of said material which have a predetermined variable effect on gaging material thickness, said apparatus comprising:

a. means for producing a constant source of penetrative radiation beamed at said material whereby emerging radiation varies according to a nonlinear absorption characteristic relative said material property,
b. a scintillator for converting said nonlinear emerging radiation into a corresponding nonlinear light source as a function of said material property,
c. detector means including a photomultiplier tube optically coupled to said nonlinear light source and having a nonlinear gain characteristic inverse and nearly equal to said nonlinear light source, said detector means adapted to produce a variable detector voltage proportional to photomultiplier anode current in response to variations in said light source and a gain controlling dynode voltage,
d. comparator means responsive to the difference between said detector voltage and a comparator reference voltage for producing an error voltage,
e. a variable source of dynode voltage acting in response to said error voltage for varying photomultiplier gain to maintain said error voltage at a predetermined minimum value over a wide range of operation and without changing photomultiplier circuit characteristics, said dynode voltage varying slightly nonlinearly and representing a measure of material thickness,
f. circuit means, including linearizer means, receiving a fraction of said dynode voltage for linearizing a slight nonlinearity in said fractional dynode voltage without changing photomultiplier circuit or gain characteristics,
g. signal conditioner means for modifying said linearized fractional dynode voltage in proportion to one or more external signal sources representing said additional properties of said material, thereby compensating said linearized fractional dynode voltage for variations caused by variations in one or more of said additional properties of said material, and
h. means for utilizing means (g) output signal to determine a linear compensated value of material thickness.

* * * * *